April 19, 1960

J. P. HEISS 2,933,309

LEVELING STRUT JOINT

Filed March 11, 1958

Inventor
John P. Heiss
by Hill, Sherman, Meroni, Gross & Simpson Attys

United States Patent Office 2,933,309
Patented Apr. 19, 1960

2,933,309

LEVELING STRUT JOINT

John P. Heiss, Flint, Mich., assignor to Thompson Products, Inc., Detroit, Mich., a corporation of Ohio Application March 11, 1958, Serial No. 720,721

11 Claims. (Cl. 267—64)

This invention relates to ball joint connectors and more particularly to a ball joint connection means arranged to interconnect a leveling strut for road vehicles and the like to an axle housing.

It is a principal object of this invention to provide a novel and improved form of ball joint connector in which the connector is arranged to be sealed and lubricated for the life of the structure to which it is attached and in which the ball joint may be readily disassembled when necessary.

It is a further object of this invention to provide a novel and improved form of ball joint connector in which the connector is also arranged to seal and position various component parts of a leveling strut for road vehicles and the like.

It is a still further object of this invention to provide a self-lubricating liner for the ball joint which will not be moved out of proper position by relative movement between various component parts of the connector.

Another object of this invention is to provide a ball joint connector having the dual purpose of movably interconnecting two or more component parts of a road vehicle and the like and maintaining and positioning various component parts in one of the structures to which it is connected, which is of simple construction and may be economically manufactured.

Figure 1:
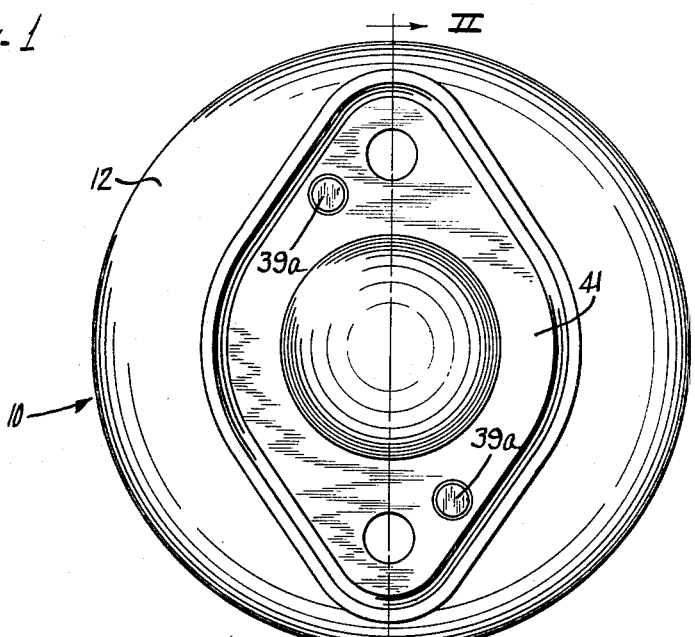
Figure 2:
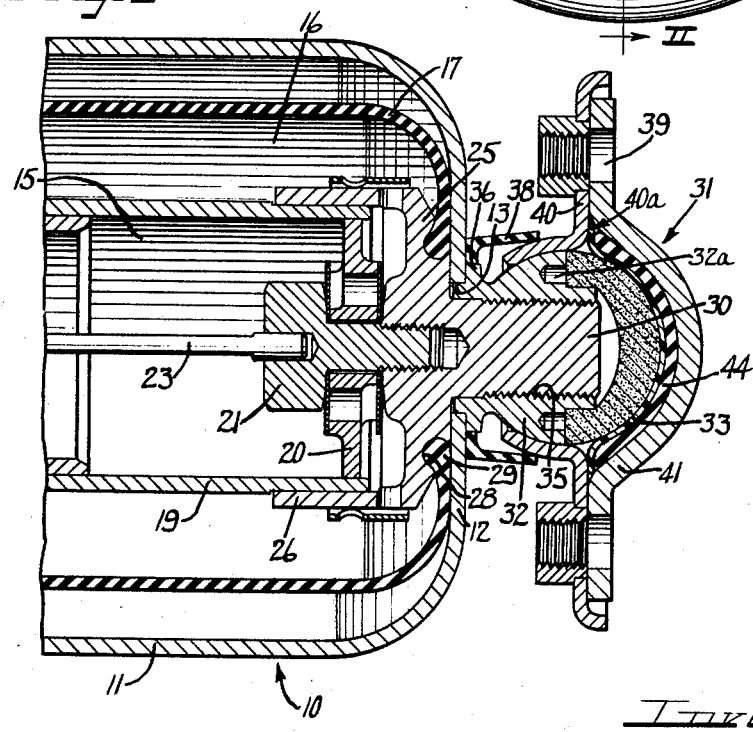

These and other objects of the invention will become apparent from time to time as the following specification proceeds and with reference to the accompanying drawings wherein:

Figure 1 is an end view of a leveling strut having a device constructed in accordance with the present invention connected therewith; and Figure 2 is a vertical sectional view through the ball joint connector and associated leveling strut taken along lines II—II of Figure 1.

As illustrated most clearly in Figure 2, a hydropneumatic leveling strut 10 is fragmentarily shown as including a generally cylindrical housing 11 having a closed end portion 12 within which a centrally positioned aperture 13 is formed. A leveling strut such as that fragmentarily shown and described in this application is fully described in applicant's copending application entitled "Leveling Strut," Serial No. 713,889, filed on February 7, 1958 and assigned to the same assignee hereof.

In general the leveling strut comprises a hydraulic, collapsible strut to be used for interconnecting the vehicle body of a road vehicle or the like and the housing of each individual axle. The strut is provided with a fluid chamber 15 having a variable volumetric capacity into which hydraulic liquid under substantial pressure is fed. The chamber formed between the container wall 11 and the resilient wall 17 is arranged to contain air under high pressure so that liquid is permitted to flow from the chamber 15 to a second chamber 16 having a pneumatically supported resilient wall 17 which will hereinafter be further described. Upon a decrease in the volumetric capacity of the strut chamber 15, hydraulic liquid will flow from the strut chamber into the hydropneumatic spring chamber 16, forcing the resilient wall 17 thereof outwardly against pneumatic pressure. Upon release of the load previously causing compression of the strut chamber, the pneumatic pressure urges the fluid from the second chamber back into the strut chamber in a resilient manner thereby providing what may be termed as a "hydropneumatic spring."

In order to provide a constant leveling in a simple manner, a continuous flow re-circulating system is provided for all of the struts as is more fully explained in applicant's copending application previously referred to. Thus liquid under high pressure is introduced through a metering valve to each strut chamber from a source of fluid under high pressure and is bled from the strut chamber or, alternately, from the air spring chamber, through a metering orifice to a reservoir.

As is clearly shown in Figure 2 a shock absorbing plate member 20 is rigidly secured to the tubular member 19 and is centrally apertured to receive a lock screw nut 21 for reasons which will hereinafter become apparent. The lock screw nut 21 is arranged to rigidly receive at its inner end portion the shaft 23 of a needle valve core (not shown) which is arranged to meter hydraulic fluid into the chamber 15. The lock screw nut 21 is threaded at its outer end portion to rigidly secure the shock absorbing plate 20 to the guide cup 25.

The guide cup 25 has an annular depending flange 26 which is arranged to be sealed to and encircles the tubular member 19 and is grooved on the outer annular surface thereof, as indicated at 28, to receive a beaded portion 29 of the resilient wall 17. The guide cup 25 also has a threaded boss 30 extending through the aperture 13 which is arranged to support the ball joint mechanism hereinafter to be described.

The ball joint 31 is shown as including two generally hemispherical portions 32 and 33, respectively. Hemispherical member 32 is helically threaded in a radial bore 35 to be received on the outer end of the helically threaded boss 30 of the guide cup 25. Furthermore, the outer wall portion of the spherical member 32 which is juxtaposed with the end wall portion 12 of the cylinder 11 is arranged to fit snugly within the aperture 13 when the member 32 is drawn down tight and has an annular lip 36 which coacts with the end wall 12 to provide a fluid tight seal about the aperture 13 between the ball joint mechanism and the hydropneumatic spring.

Hence, it may be seen that the hemispherical member 32 not only provides a means for forming a seal within the aperture 13 but also further provides a means for drawing up the cup member 25 to secure the beaded portions 29 of the resilient wall 17 within the annular grooves 28. It will be further noted (with particular reference to applicant's copending application) that the various component parts of the hydropneumatic spring portion of the leveling strut can be disassembled merely by removal of the hemispherical nut 32 from the threaded boss 30. To facilitate removal of the hemispherical member 32 from the boss 30, spanner wrench holes 32a are provided on the outer flat surface of the member 32 so that a spanner wrench may be used to unscrew the member 32.

The second substantially hemispherical member 33 may be formed of powdered iron and is positioned with respect to hemispherical member 32 to substantially form a sphere. This hemispherical member 33 is preferably formed of powdered iron because such a material is highly porous and will thus receive and maintain the original lubrication for a long period of time. Inner and outer stampings 40 and 41 respectively, are arranged to envelop hemispherical members 32 and 33 for the purposes of maintaining the hemispherical members in juxtaposition with one another and providing a movable joint connection between the stampings and the hemispherical members. The inner and outer stampings 40 and 41 respectively, are maintained in engagement with one another by a plurality of bolts 39 as is well known in the art and may be superficially held together by rivets 39a. However, in applicant's device the outer stamping 41 is formed incongruous with the inner stamping 40 so as to prevent slippage of a rubber liner 44 as will hereafter become apparent. A self-lubricating plastic such as Teflon and cotton fabric may be vulcanized to the loose rubber liner to provide a simple and efficient means of lubricating the hemispherical member 33. It is apparent from Figure 2 that the incongruity between the inner and outer stampings 40 and 41 respectively provides an annular abutment 40a for the plastic liner hereinbefore referred to. For the purposes of maintaining original lubrication within the ball joint 31 a resilient sealing ring 38 is provided to encircle the lip 36 and abut the outer surface of the inner stamping 40.

It will now become apparent that while the lubricating liner and rubber liner are loosely positioned between the hemispherical member 33 and the outer stamping 41 the incongruity between the inner and outer stampings 40 and 41 will always maintain the liners in the proper position with respect to the hemispherical member 33. It will further be seen that applicant has devised a self-lubricating ball joint which is simultaneously functional to seal the outer end of the generally cylindrical container 11. Furthermore, disassemblage of the entire hydropneumatic spring portion of the leveling strut structure may be accomplished by merely unscrewing hemispherical member 32 from the threaded boss 30.

It will herein be understood that this embodiment of the invention has been used for illustrative purposes only and that various modifications and variations of the present invention may be effected without departing from the spirit and scope of the novel concepts thereof.

I claim as my invention:

1. In a hydropneumatic spring portion of a telescopic leveling strut for road vehicles including a casing having an aperture through one wall portion thereof, a resilient bladder within said casing forming fluid chambers on opposite sides thereof, a cup member within said casing maintaining a portion of said bladder in engagement with the wall portion of said container defining said aperture, a threaded boss formed integrally with said cup member and extending through said aperture, a substantially hemispherical sealing nut threadably mounted on said threaded boss, an annular lip formed integrally with said sealing nut wherein said lip cooperates with the wall portion of said casing defining said aperture to effectuate a fluid tight seal therebetween.

2. In a hydropneumatic spring portion of a telescopic leveling strut for road vehicles including a casing having an aperture through one wall portion thereof, a resilient bladder within said casing forming fluid chambers on opposite sides thereof, a cup member within said casing maintaining a portion of said bladder in engagement with the wall portion of said container defining said aperture, a threaded boss formed integrally with said cup member and extending through said aperture, a substantially spherical sealing nut mounted on said threaded boss, a lip formed integrally with said sealing nut and cooperating with the wall portion of said container defining said aperture to form a fluid tight seal therebetween, wherein said substantially spherical sealing nut forms the ball portion for a ball and socket joint.

3. In a hydropneumatic spring portion of a telescopic leveling strut for road vehicles including a casing having an aperture through one wall portion thereof, a resilient bladder within said casing forming fluid chambers on opposite sides thereof, a cup member within said casing maintaining a portion of said bladder in engagement with the wall portion of said container defining said aperture, a threaded boss formed integrally with said cup member and extending through said aperture, a sealing nut threadably mounted on said boss, a lip integrally formed with said sealing nut and cooperating with the wall of said container defining said aperture to form a fluid tight seal therebetween, a second hemispherical member arranged to abut said sealing nut and cooperable therewith to form a ball member and a socket for said ball member cooperating therewith to form a movable ball joint.

4. In a hydropneumatic spring portion of a telescopic leveling strut for road vehicles including a casing having an aperture through one wall portion thereof, a resilient bladder within said casing forming fluid chambers on opposite sides thereof, a cup member within said casing maintaining a portion of said bladder in engagement with the wall portion of said container defining said aperture, a threaded boss formed integrally with said cup member and extending through said aperture, a sealing nut threadably mounted on said boss, a lip integrally formed with said sealing nut and cooperating with the wall of said container defining said aperture to form a fluid tight seal therebetween, a second hemispherical member arranged to abut said sealing nut and cooperable therewith to form a ball member, a socket for said ball member cooperating therewith to form a movable ball joint, and a self-lubricating plastic member lying between said ball member and said socket.

5. In a hydropneumatic spring portion of a telescopic leveling strut for road vehicles including a casing having an aperture through one wall portion thereof, a resilient bladder within said casing forming fluid chambers on opposite sides thereof, a cup member within said casing maintaining a portion of said bladder in engagement with the wall portion of said container defining said aperture, a threaded boss formed integrally with said cup member and extending through said aperture, a sealing nut threadably mounted on said boss, a lip integrally formed with said sealing nut and cooperating with the wall of said container defining said aperture to form a fluid tight seal therebetween, a second hemispherical member having a high degree of porosity arranged to abut said sealing nut and cooperable therewith to form a ball member, a socket for said ball member cooperating therewith to form a movable ball joint, and a self-lubricating plastic member lying between said ball member and said socket.

6. In a hydropneumatic spring portion of a telescopic leveling strut for road vehicles including a casing having an aperture through one wall portion thereof, a resilient bladder within said casing forming fluid chambers on opposite sides thereof, a cup member within said casing maintaining a portion of said bladder in engagement with the wall portion of said container defining said aperture, a threaded boss formed integrally with said cup member and extending through said aperture, a sealing nut threadably mounted on said boss, a lip integrally formed with said sealing nut and cooperating with the wall of said container defining said aperture to form a fluid tight seal therebetween, a second hemispherical member arranged to abut said sealing nut and cooperable therewith to form a ball member, a first stamping movably engaging a portion of said ball member, a second stamping enveloping a major portion of said ball member and suitably connected to said first stamping, said second stamping being formed incongruously with said first stamping and a self-lubricating liner lying between said ball member and said second stamping.

7. In a hydropneumatic spring portion of a telescopic leveling strut for road vehicles including a casing having an aperture through one wall portion thereof, a resilient bladder within said casing forming fluid chambers on opposite sides thereof, a cup member within said casing maintaining a portion of said bladder in engagement with the wall portion of said container defining said aperture, a threaded boss formed integrally with said cup member and extending through said aperture, a sealing nut threadably mounted on said boss, a lip integrally formed with said sealing nut and cooperating with the wall of said container defining said aperture to form a fluid tight seal therebetween, a second hemispherical member having a high degree of porosity arranged to abut said sealing nut and cooperable therewith to form a ball member, a first stamping movably engaging a portion of said ball member, a second stamping enveloping a major portion of said ball member and suitably connected to said first stamping, said second stamping being formed incongruously with said first stamping and a self-lubricating liner lying between said ball member and said second stamping.

8. In a hydropneumatic spring portion of a telescopic leveling strut for road vehicles including a casing having an aperture through one wall portion thereof, a resilient bladder within said casing forming fluid chambers on opposite sides thereof, a cup member within said casing maintaining a portion of said bladder in engagement with the wall portion of said container defining said aperture, a threaded boss formed integrally with said cup member and extending through said aperture, a sealing nut threadably mounted on said boss, a lip integrally formed with said sealing nut and cooperating with the wall of said container defining said aperture to form a fluid tight seal therebetween, a second hemispherical member arranged to abut said sealing nut and cooperable therewith to form a ball member, a first stamping enveloping a portion of said ball member, a second stamping incongruously connected with said first stamping and cooperable therewith to form a socket for said ball member and a self-lubricating liner between said second stamping and said ball member and abutting at its periphery the inner annular surface of said first stamping.

9. In a hydropneumatic spring portion of a telescopic leveling strut for road vehicles including a casing having an aperture through one wall portion thereof, a resilient bladder within said casing forming fluid chambers on opposite sides thereof, a cup member within said casing maintaining a portion of said bladder in engagement with the wall portion of said container defining said aperture, a threaded boss formed integrally with said cup member and extending through said aperture, a sealing nut threadably mounted on said boss, a lip integrally formed with said sealing nut and cooperating with the wall of said container defining said aperture to form a fluid tight seal therebetween, a second hemispherical member having a high degree of porosity arranged to abut said sealing nut and cooperable therewith to form a ball member, a first stamping enveloping a portion of said ball member, a second stamping incongruously connected with said first stamping and cooperable therewith to form a socket for said ball member and a self-lubricating liner between said second stamping and said ball member and abutting at its periphery the inner annular surface of said first stamping.

10. A ball joint connector comprising a spherical ball member having a tension load-bearing first hemispherical member and a porous metal compression load-bearing second hemispherical member, a pair of confining members enveloping said ball member and maintaining said hemispherical members in proper joined spherical relation, and a lubricating liner disposed between at least one of said confining members and said ball member.

11. A ball joint connector comprising a spherical ball member having a tension load-bearing first hemispherical member and a porous metal compression load-bearing second hemispherical member, a first stamping enveloping a substantial portion of said ball member and having an annular surface extending substantially radially outwardly from said ball member, a second stamping enveloping a second substantial portion of said ball member and incongruously connected to the annular surface of said first stamping, said stampings cooperating to maintain said hemispherical members in proper joined spherical relation, and a self lubricating lining between said second stamping and said ball member and having its outer periphery abutting the inner annular surface of said first stamping.

References Cited in the file of this patent
UNITED STATES PATENTS

| 2,752,178 | Hoffman | June 26, 1956 |
| 2,802,664 | Jackson | Aug. 13, 1957 |
| 2,814,538 | Connolly | Nov. 26, 1957 |
| 2,823,055 | Booth | Feb. 11, 1958 |

UNITED STATES PATENT OFFICE

CERTIFICATE OF CORRECTION

Patent No. 2,933,309            April 19, 1960

John P. Heiss

It is hereby certified that error appears in the above numbered patent requiring correction and that the said Letters Patent should read as corrected below.

In the grant, lines 2 and 3, for "Thompson Products, Inc., of Detroit, Michigan, a corporation of Ohio," read -- Thompson Ramo Wooldridge Inc., a corporation of Ohio, --; line 12, for "Thompson Products, Inc.," read -- Thompson Ramo Wooldridge Inc., --; in the heading to the printed specification, lines 3 and 4, for "Thompson Products, Inc., Detroit, Mich., a corporation of Ohio" read -- Thompson Ramo Wooldridge Inc., a corporation of Ohio --.

Signed and sealed this 20th day of September 1960.

(SEAL)
Attest:

KARL H. AXLINE
Attesting Officer

ROBERT C. WATSON
Commissioner of Patents